Sept. 25, 1928.
E. G. JOHANSSON
1,685,490
CASING FOR SAFETY SWITCHES
Filed May 14, 1926
2 Sheets-Sheet 1
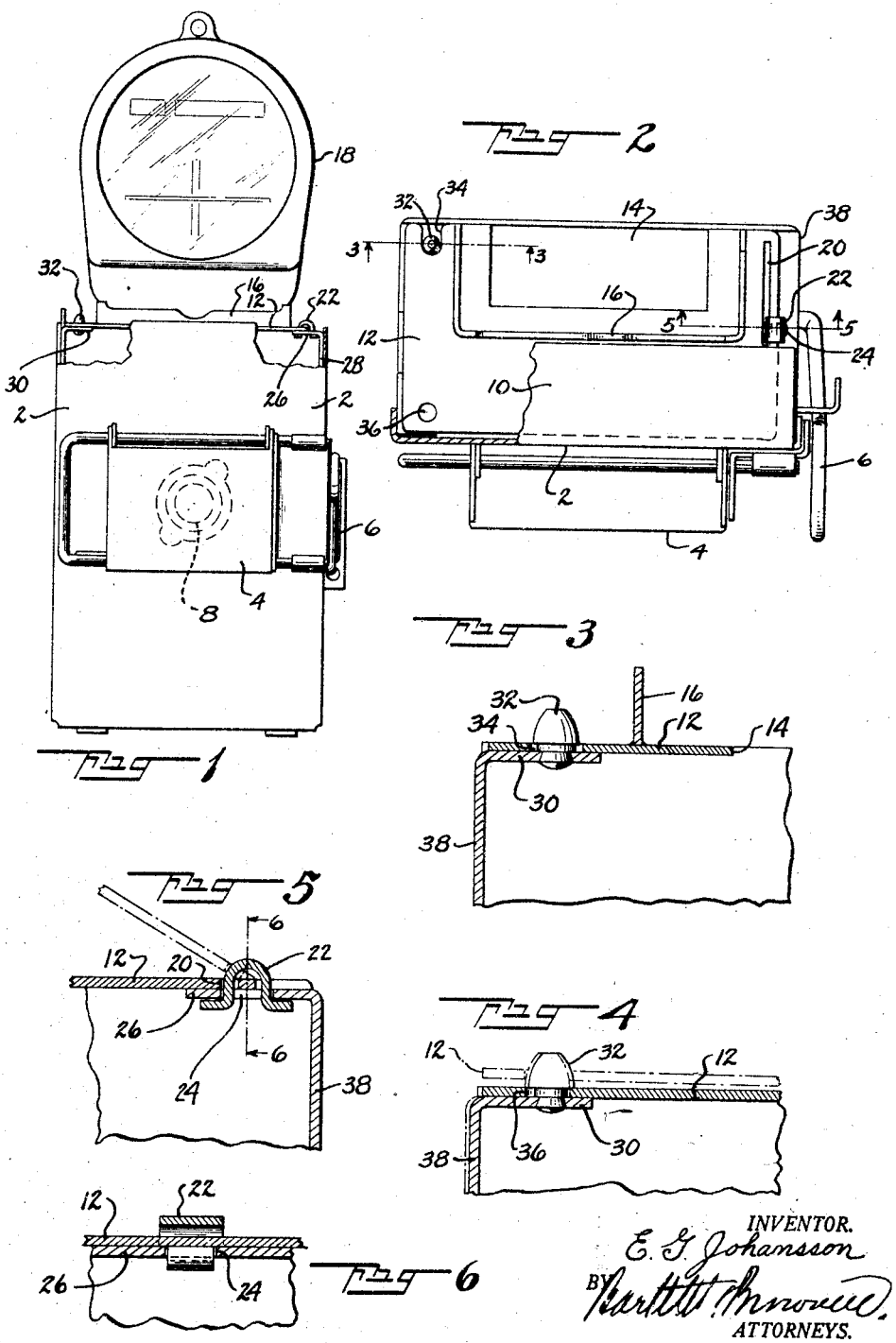

Sept. 25, 1928.
E. G. JOHANSSON
1,685,490
CASING FOR SAFETY SWITCHES
Filed May 14, 1926
2 Sheets-Sheet 2
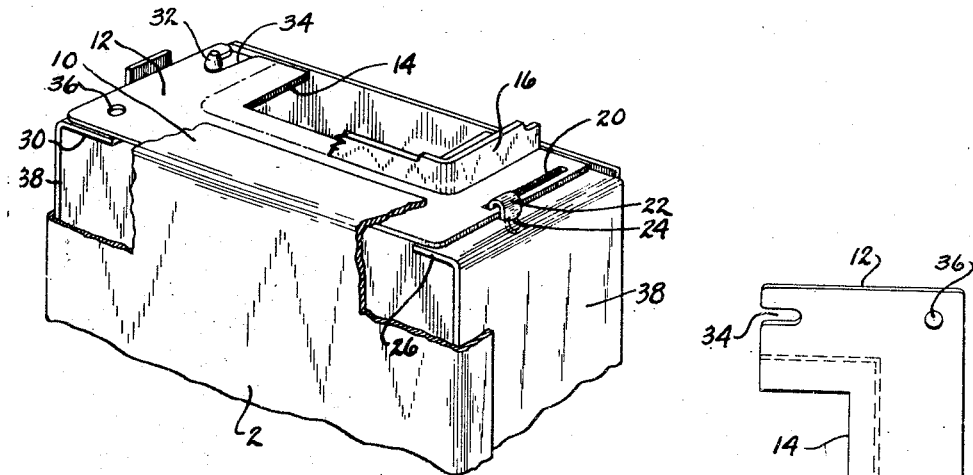
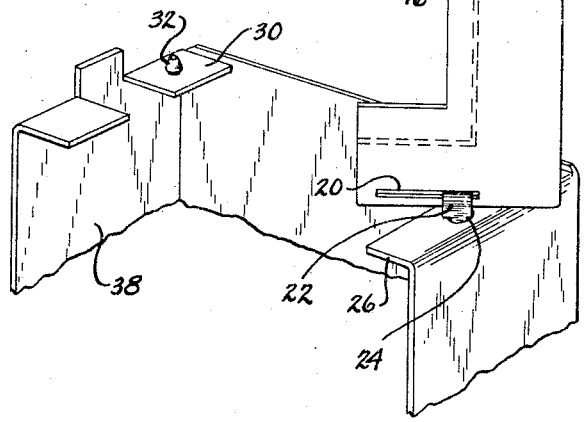
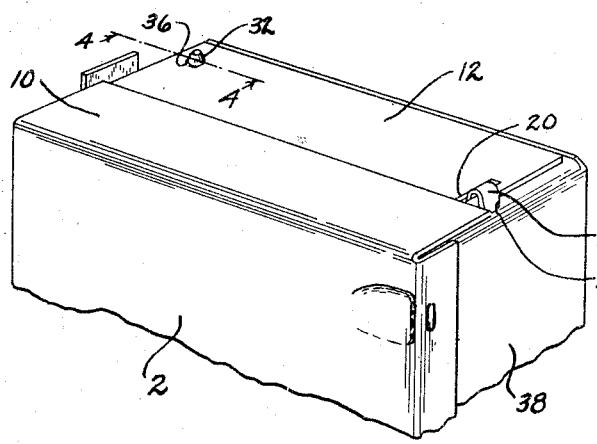
INVENTOR.
E. G. Johansson
BY
ATTORNEYS.

Patented Sept. 25, 1928.

1,685,490

UNITED STATES PATENT OFFICE.

ERNEST G. JOHANSSON, OF BOSTON, MASSACHUSETTS, ASSIGNOR, BY MESNE ASSIGNMENTS, TO THE PALMER ELECTRIC & MANUFACTURING CO., OF WALTHAM, MASSACHUSETTS, A CORPORATION OF MASSACHUSETTS.

CASING FOR SAFETY SWITCHES.

Application filed May 14, 1926. Serial No. 109,031.

My invention relates to casings for safety switches and has for its object to provide a casing having an adapter permanently secured to the body thereof, which in one position adapts the casing to the terminal chamber of a meter and in the other position produces a closed end casing.

My invention further has for its object to produce a casing having an adapter plate permanently secured to the casing body by a swiveled hinge.

The following is a description of an embodiment of my invention, reference being had to the accompanying drawings, in which, Fig. 1 shows, in conjunction with an electric meter, a front elevation of a casing embodying my invention;

Fig. 2 shows a plan view of the same with the meter removed and parts broken away;

Fig. 3 is a detail on the line 3—3, Fig. 2;

Fig. 4 is a detail on the line 4—4, Fig. 9;

Fig. 5 is a detail section on the line 5—5, Fig. 2;

Fig. 6 is a section on the line 6—6, Fig. 5;

Fig. 7 is a perspective view of the upper end of the casing;

Fig. 8 is a perspective view showing the adapter plate being reversed in position; and Fig. 9 is a perspective view of the upper end of the meter after the adapted plate has been reversed and the main cover applied so as to close the upper end of the casing.

Referring more particularly to the drawings, 2 is the main cover of a switch casing having thereon an auxiliary cover 4 and means coacting with the switch actuating handle 6 for controlling access to a fuse 8 beneath the auxiliary cover. This auxiliary cover and associated parts do not, however, form a part of the present invention. The main cover 2 is provided at its upper end with a flange 10 partially closing the opening at the upper end of the casing body. Extending part way beneath this flange is an adapter plate 12 having the usual opening 14 and a frame 16 for receiving a portion of the terminal chamber of a meter 18. This adapter plate, in the construction shown, is provided with a slot 20 extending about halfway along one side thereof and through this slot passes one leg of a loop 22, both legs of which pass through a circular opening 24 in a flange 26 projecting inwardly from the side wall 28 of the casing, thus hinging the plate 12 to the side wall 28 with a swiveled hinge so as to permit it to be raised and lowered and when in the position shown in Fig. 8 turned on its longitudinal axis so that the cutaway portion 14 can be brought underneath the flange 10 as shown in Fig. 9, or can be brought outside that flange as shown in Fig. 2. The flange 30 of the casing is provided with a stud 32 having beneath its head an undercut forming a recess. The plate is provided with an opening in the form of a notch 34 on the same side as and adjacent to the cutaway portion 14, which notch passes freely over the stud 32. The plate is also provided with an opening in the form of a hole 36 which, when the adapter plate is turned to end closing position, passes over the stud 32 but is so located that in doing so it forces the stud 32 slightly to the left, the wall of the casing yielding to permit such movement, and snaps into the undercut beneath the head of the stud as shown in Fig. 4. This holds that end of the plate in position when the meter is removed and the adapter is turned so as to perform its end closing function.

In practice when a meter is being installed the main cover is removed from the casing body 38 and the adapter is swung over toward the right so as to be out of the way of the meter to be installed, the casing body 38 being secured to the wall in proper position. The meter is then secured in proper position and connected up, and the adapter is then swung to the left, being drawn out as permitted by the slot 20 so as to escape the terminal chamber in the meter and being subsequently moved inward to the position shown in Fig. 2. The main cover 2 is then applied to the casing body and sealed in position in the ordinary way, acting to hold the adapter plate in position.

When the meter is removed and it is desired to seal the casing, the main cover 2 is opened and the adapter plate 12 lifted to the position shown in Fig. 8 and turned on its longitudinal axis and then brought down to the position indicated in Fig. 9, the hole 36 passing over the head of the stud 32 and the edge of the hole snapping into the recess beneath said head. The main cover 2 is then applied, the flange 10 covering the cutaway portion 14 of the adapter, and the side flanges of the main cover preventing the side walls of the casing body from being moved so as to release the stud 32 from the adapter in its closing position. If it is desired to release the adapter from closing position the main cover 2 is again removed and the side walls of the casing body sprung sufficiently to cause the stud 32 to release the corresponding end of the adapter plate.

In this way a casing having an adapter which is permanently secured to the body of the casing is provided, the construction being such that the adapter can be moved so as to be entirely out of the way of the mechanic when installing or removing a meter and be positioned so that the end of the casing is closed.

I do not claim herein broadly the combination with a switch casing of a meter adapter plate which may be associated with the casing in one manner to cooperate with a meter and in another manner to complete the closure of the casing when no meter is present, this subject matter being claimed in the joint application for patent of Granville E. Palmer and myself, Serial No. 615,320, filed January 27, 1923, for switch casing and meter adapter.

As will be evident to those skilled in the art, my invention permits of various modifications without departing from the spirit thereof or the scope of the appended claims.

What I claim is:

1. The combination of a casing body open at one end, a meter adapter plate for said end, means permanently securing said plate to said body and permitting its reversal about a longitudinal axis and its movement about an axis at right angles to said longitudinal axis, and a main cover for said body portion having a flange overlapping a portion of said plate, said plate having on one side of its longitudinal axis a meter adapting opening which when in one position is closed by said flange and on the other side of said axis a solid portion which when said opening is so closed completes the closure of the casing, said plate having an elongated slot coacting with said securing means so as to permit said plate to be moved transversely to said axis.

2. The combination of a casing body open at one end, a meter adapter plate for said end, a swiveled hinge securing said plate to said body and permitting its reversal about its longitudinal axis and a main cover having a flange overlapping a portion of said plate, said plate having on one side of its longitudinal axis a meter adapting opening which when in one position is closed by said flange and on the other side of said axis a solid portion which when said opening is so closed completes the closure of the casing, said plate having an elongated slot coacting with said swivelled hinge so as to permit said plate to be moved transversely of said axis.

3. The combination of a casing body having an open end provided with inwardly extending side flanges, an adapted plate engaging said flanges and having a closed slot at one end, a member swiveled to one of said flanges and passing through said slot so as to hinge said plate to said flange, said plate being thereby secured to said casing and reversible about its longitudinal axis and movable relatively to said member in a direction parallel to said slot and being cut away on one side so as to form a meter adapter, and a cover adapted to be sealed to said body and provided with a flange overlying a portion of said plate and adapted to cover said cut-away portion when said plate is in one of its positions.

4. The combination of a casing body having an open end provided with inwardly extending side flanges, an adapter plate engaging said flanges and having a closed slot at one end, a member swiveled to one of said flanges and passing through said slot so as to hinge said plate to said flange, said plate being thereby secured to said casing and reversible about its longitudinal axis and movable relatively to said member in a direction parallel to said slot and being cut away on one side so as to form a meter adapter, and a cover adapted to be sealed to said body and provided with a flange overlying a portion of said plate and adapted to cover said cut-away portion when said plate is in one of its positions, said other flange having a projecting pin adjacent to its rear end and said plate having two openings adjacent to and remote from said cut-away portion respectively and adapted to receive said pin.

5. The combination of a casing body having an open end provided with inwardly extending side flanges, an adapter plate engaging said flanges and having a closed slot at one end, a member swiveled to one of said flanges and passing through said slot so as to hinge said plate to said flange, said plate being thereby secured to said casing and reversible about its longitudinal axis and movable relatively to said member in a direction parallel to said slot and being cut away on one side so as to form a meter adapter, and a cover adapted to be sealed to said body and provided with a flange overlying a portion of said plate and adapted to cover said cut-away portion when said plate is in one of its positions, said other flange having a projecting pin adjacent to its inner end and said plate having two openings adjacent to and remote from said cut-away portion respectively and adapted to receive said pin, said pin having an undercut portion and the opening remote from said cut-away portion having one edge adapted to extend into said undercut portion.

6. The combination of a casing body having an open end providing an entrance to said casing, an adapter plate, a swivelled hinge permanently securing said adapter plate to one wall of said casing and permitting said plate to be moved to entirely uncover the open end of said casing, said swivelled hinge rendering said adapter plate reversible about its longitudinal axis, said plate having on one side of its longitudinal axis a meter adapting opening which when in one position is closed by said flange and on the other side of said axis a solid portion which when said opening is so closed completes the closure of the casing, said plate having an elongated slot coacting with said swivelled hinge so as to permit said plate to be moved transversely of said axis.

In testimony whereof, I have signed my name to this specification this 12th day of May, 1926.

ERNEST G. JOHANSSON.